(12) United States Patent
Orikabe

(10) Patent No.: US 7,909,020 B2
(45) Date of Patent: Mar. 22, 2011

(54) CONTROLLER FOR INTERNAL COMBUSTION ENGINE

(75) Inventor: Kentaro Orikabe, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/486,258

(22) Filed: Jun. 17, 2009

(65) Prior Publication Data

US 2010/0010726 A1     Jan. 14, 2010

(30) Foreign Application Priority Data

Jul. 11, 2008    (JP) .................................. 2008-181963

(51) Int. Cl.
*F02M 69/54*      (2006.01)
(52) U.S. Cl. ......... 123/457; 123/511; 123/479; 701/107
(58) Field of Classification Search .................. 123/1 A, 123/435, 457, 511, 512, 198 A, 431, 494, 123/703, 575, 479; 60/276, 285, 286; 73/35.02, 73/114.38, 114.43; 701/103–105, 107
See application file for complete search history.

(56) References Cited

U.S. PATENT DOCUMENTS

| 5,179,926 | A | * | 1/1993 | Ament ........................... 123/494 |
| 6,125,832 | A | | 10/2000 | Toyohara et al. |
| 7,025,050 | B2 | * | 4/2006 | Oono et al. .................... 123/690 |
| 2010/0071661 | A1 | * | 3/2010 | Joos et al. ..................... 123/435 |

FOREIGN PATENT DOCUMENTS

JP      2010-19199     *   1/2010

* cited by examiner

*Primary Examiner* — Hai H Huynh
(74) *Attorney, Agent, or Firm* — Nixon & Vanderhye P.C.

(57) ABSTRACT

At least one of a petroleum fuel and an alcohol fuel stored in a fuel tank is supplied to an internal combustion engine. Specifically, the fuel in the fuel tank is supplied to an injector by a fuel pump module. The injector injects the fuel into an intake pipe. An ECU adjusts a fuel injection quantity according to an alcohol concentration of the fuel. When the fuel-supply-pressure to the injector is less than or equal to a threshold pressure, the ECU determines the fuel pump module has a malfunction. Especially, the ECU varies the threshold pressure according to the alcohol concentration of the fuel.

5 Claims, 4 Drawing Sheets

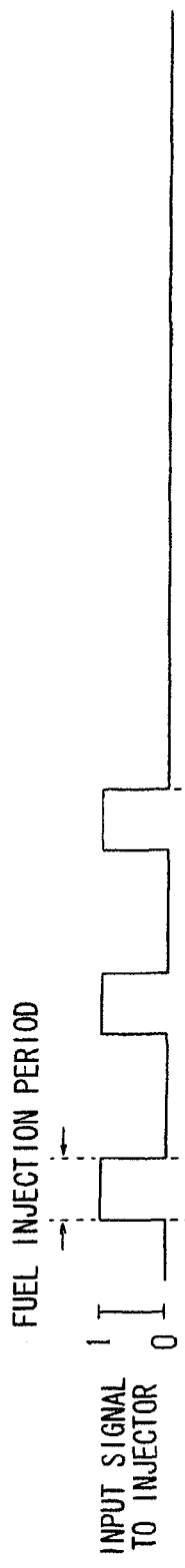
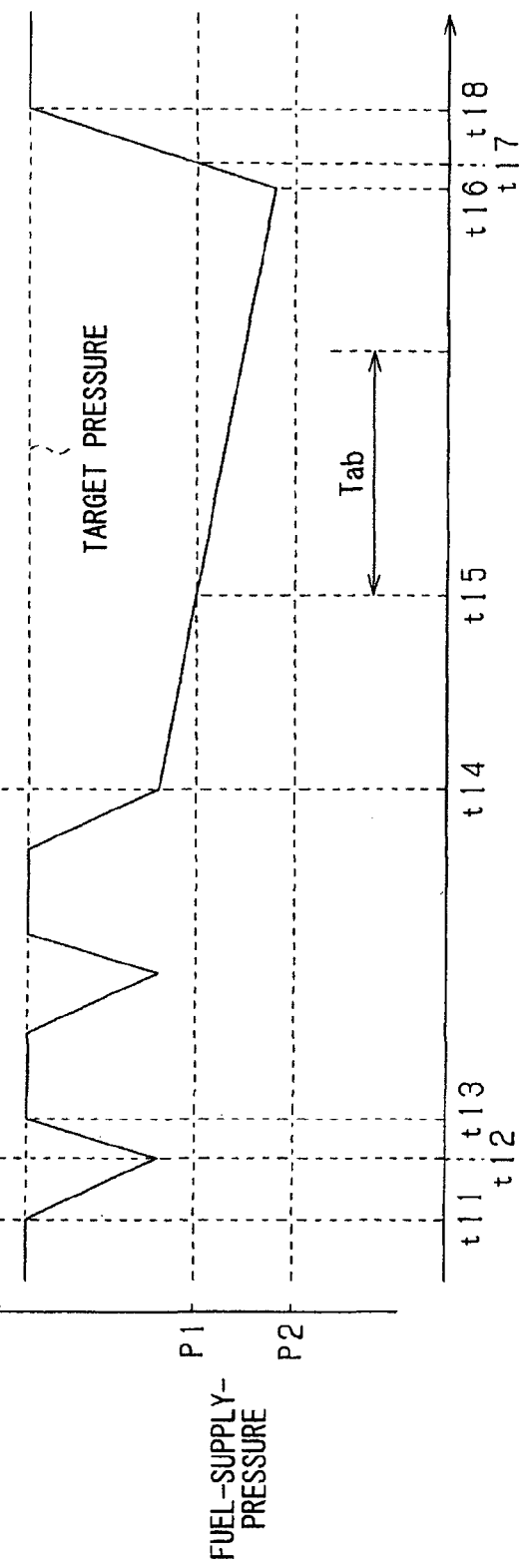
FIG. 2A
FIG. 2B

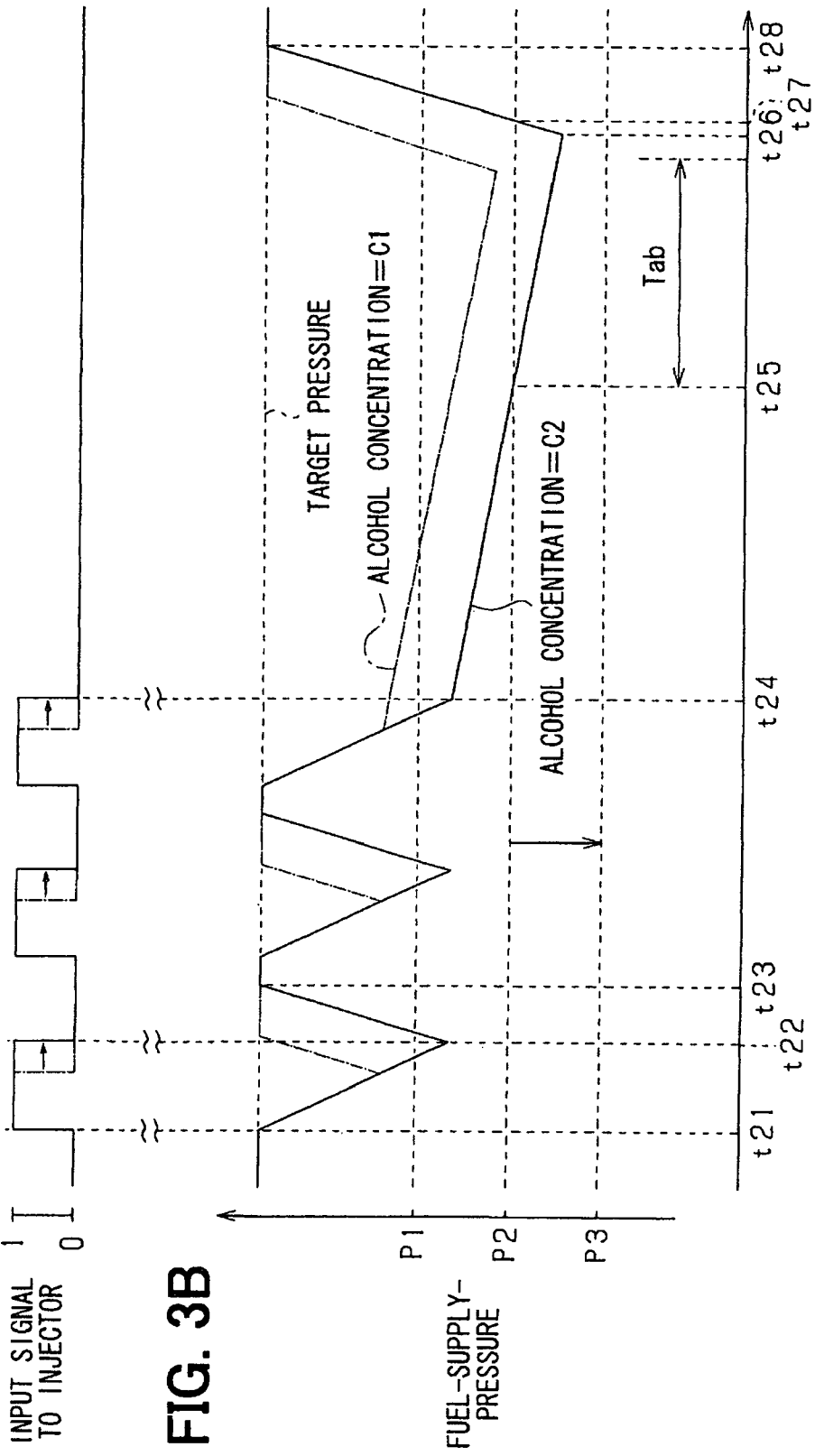

CONTROLLER FOR INTERNAL COMBUSTION ENGINE

CROSS-REFERENCE TO RELATED APPLICATION

This application is based on Japanese Patent Application No.2008-181963 filed on Jul. 11, 2008, the disclosure of which is incorporated herein by reference.

FIELD OF THE INVENTION

The present invention relates to a controller detecting a malfunction of a pump device. The pump device pumps fuel into a fuel injector of an internal combustion engine.

BACKGROUND OF THE INVENTION

Recently, an internal combustion engine which can use many kinds of fuel (petroleum fuel, alcohol fuel, mixed fuel of petroleum fuel and alcohol fuel) has been developed. A stoichiometric air-fuel ratio of the fuel increases with the alcohol concentration. A fuel quantity supplied to the engine is controlled so that the air-fuel ratio agrees with the stoichiometric air-fuel ratio. The fuel quantity supplied to the engine varies according to the alcohol concentration.

A fuel supply system for supplying fuel in a fuel tank into the engine is provided with a pump device pumping the fuel in the fuel tank and an injector injecting the pumped fuel into the engine. In the fuel supply system, when the pump device has a malfunction, fuel pressure of the fuel supplied to the injector is decreased so that the fuel supply to the engine becomes insufficient. JP-11-190240A (U.S. Pat. No. 6,125,832) shows a fuel supply apparatus in which fuel-supply-pressure to an injector is detected and a malfunction of a pump device is detected based on the detected fuel-supply-pressure. However, if the apparatus shown in JP-11-190240A is applied to the engine which can use many kinds of fuel, following problems will occur. That is, when the fuel supply quantity to the injector is increased according to the alcohol concentration of the fuel, a fuel-supply-pressure drop due to the fuel injection is increased. As the result, even though the pump device has no malfunction, it is determined that the pump device has malfunction. An accuracy of malfunction detection of the pump device is deteriorated.

SUMMARY OF THE INVENTION

The present invention is made in view of the above matters, and it is an object of the present invention to provide a controller for an internal combustion engine, which correctly detects a malfunction of the pump device pumping the fuel to the injector.

According to the present invention, a controller for an internal combustion engine applied to a fuel supply system in which at least one of a petroleum fuel and an alcohol fuel stored in a fuel tank is supplied to an internal combustion engine. The fuel supply system includes a pump device pumping the fuel stored in the fuel tank and an injector injecting the fuel pumped by the pump device into the internal combustion engine. The injector injects the fuel of which quantity is varied according to an alcohol concentration of the fuel. The controller detects a fuel pressure supplied to the injector and detects a malfunction of the pump device when the fuel pressure is less than or equal to a threshold pressure.

The controller detects an alcohol concentration of the fuel supplied to the internal combustion engine and sets the threshold pressure lower as the alcohol concentration detected by the alcohol concentration detecting means is higher.

According to the present invention, when the fuel injection quantity is increased according to the alcohol concentration of the fuel and the fuel-supply-pressure drop increases, the threshold pressure is set lower according to the alcohol concentration. Thereby, it is restricted that the computer determines the fuel-supply-pressure becomes lower than or equal to the threshold pressure even though the pump device has no malfunction. Thus, an erroneous detection of a malfunction of the pump device can be avoided. A malfunction of the pump device can be correctly detected.

BRIEF DESCRIPTION OF THE DRAWINGS

Other objects, features and advantages of the present invention will become more apparent from the following description made with reference to the accompanying drawings, in which like parts are designated by like reference numbers and in which:

FIGS. 2A and 2B are timing charts showing an abnormality detecting processing of a fuel pump module;

FIGS. 3A and 3B are timing charts showing an abnormality detecting processing of a fuel pump module under a condition where an alcohol concentration of a fuel is high.

DETAILED DESCRIPTION OF EMBODIMENTS

First Embodiment

Figure 1:
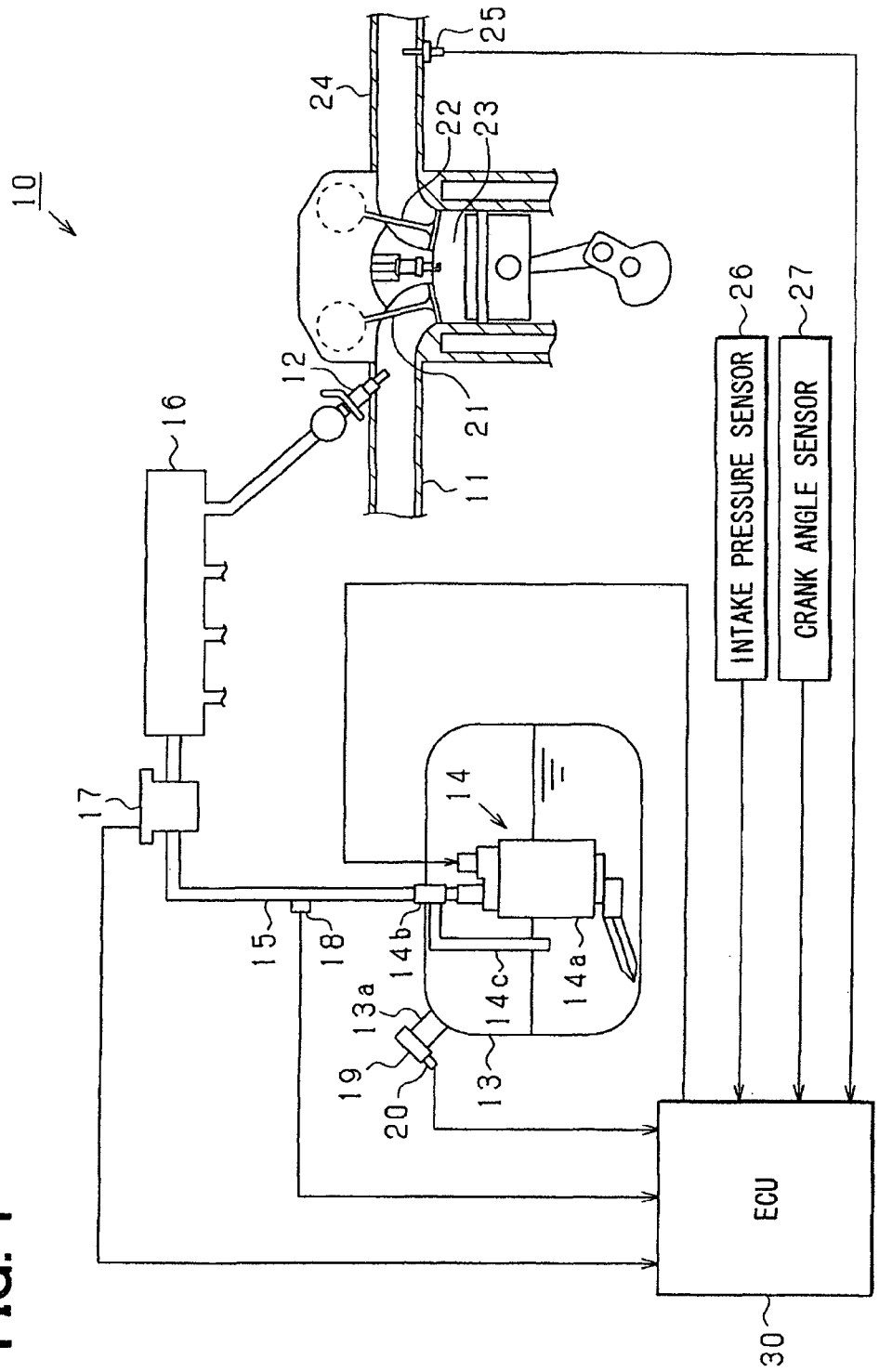
FIG. 1 is a block diagram showing an engine control system.

Hereinafter, a first embodiment that embodies the present invention will be described with reference to the drawings. In the present embodiment, the internal combustion engine is a multi-cylinder engine. At least one of petroleum fuel (gasoline) and alcohol fuel (ethanol or methanol) can be combusted in the engine. That is, in this engine, only gasoline is used or mixed fuel of gasoline and alcohol is used as the fuel. A ratio between gasoline and alcohol is arbitrary number. FIG. 1 shows an entire engine control system. In FIG. 1, only single cylinder is illustrated for a convenience of explanation.

A fuel injector 12 is provided to an intake pipe 11 at a vicinity of an intake port of an engine 10. A fuel injector 12 is an electromagnetic fuel injection valve. The injector 12 is energized by a power source (not shown). An electronic control unit (ECU) 30 controls a fuel injection timing and fuel injection period.

Fuel stored in a fuel tank 13 is supplied to the injector 12. Specifically, a fuel pump module 14 is provided in the fuel tank 13. The fuel in the fuel tank 13 is pumped to a delivery pipe 16 through a fuel supply pipe 15 by the fuel pump module 14. The fuel in the delivery pipe 16 is supplied to the injector 12. The fuel pump module 14 corresponds to a pump device.

The fuel pump module 14 includes a pump body 14a and a pressure regulator 14b. The pump body 14a is an electric pump which pumps the fuel to the injector 12. The pump body 14a receives electricity from the power source and its pumping quantity is controlled by the ECU 30.

The pressure regulator 14b is a mechanical pressure reducing valve which opens when the fuel-supply-pressure exceeds a regulation pressure. Excessive fuel is returned from the fuel supply pipe 15 to the fuel tank 13 through a return pipe 14c.

There is a possibility that fuel in the injector 12 leaks to the intake pipe 11 if high-pressure fuel remains in the delivery pipe 16 after the engine is stopped. If the fuel leaks to the intake pipe 11, the fuel is evaporated toward atmosphere and emission is deteriorated. To avoid such a fuel leak, the pressure regulator 14b is provided with a return passage (not shown) having an orifice of which opening area is smaller than the cross sectional area of the fuel supply pipe 15. This return passage is fluidly connected to the return pipe 14c. Thus, after the engine is stopped, the fuel in the delivery pipe 16 is returned to the fuel tank 13 through the orifice. The fuel leakage to the intake pipe 11 is restricted. Besides, the pressure regulator 14b may be provided in the fuel supply pipe 15 or the delivery pipe 16.

A fuel property sensor 17 detecting alcohol concentration of the fuel and a fuel pressure sensor 18 detecting a pressure of fuel supplied to the injector 12 are provided in a fuel supply passage (the fuel supply pipe 15 and the delivery pipe 16) between the fuel pump module 14 and the injector 12. In the present embodiment, the fuel property sensor 17 and fuel pressure sensor 18 are provided in the fuel supply pipe 15. A filler cap 19 is attached to a filler neck 13a of the fuel tank 13. A filler cap sensor 20 detecting opening/closing of the filler cap 19 is provided to the filler neck 13a.

An intake valve 21 and an exhaust valve 22 are respectively provided to an intake port and an exhaust port of the engine 10. When the intake valve 21 is opened, air-fuel mixture is introduced into a combustion chamber 23. When the exhaust valve 22 is opened, exhaust gas is discharged into the exhaust pipe 24. An oxygen (O2) sensor 25 detecting air-fuel ratio of the exhaust gas is provided in the exhaust pipe 24.

The ECU 30 is mainly constructed of a microcomputer having a CPU, a ROM, a RAM, an EEPROM and the like. The ECU 30 is electrically connected to the fuel property sensor 17, the fuel pressure sensor 18, the filler cap sensor 20, the O2 sensor 25, an intake pressure sensor 26, and a crank angle sensor 27 detecting an intake pressure in the intake pipe 11. The ECU 30 controls each unit of the engine control system by executing programs stored in a memory.

For example, the ECU 30 executes a fuel injection quantity control to adjust fuel injection quantity. More specifically, the ECU 30 computes an air-fuel ratio based on output signals of the O2 sensor 25 and controls the fuel injection quantity so that the computed air-fuel ratio agrees with a target air-fuel ratio (for example, a stoichiometric air-fuel ratio). Such an air-fuel ratio feedback control improves an emission of the engine. Furthermore, the ECU 30 executes a fuel pressure control in which the fuel pressure supplied to the injector 12 is adjusted to a predetermined target fuel pressure. Specifically, the ECU 30 computes a fuel-supply-pressure to the injector 12 based on the output signals of the fuel pressure sensor 18. Then, the ECU 30 controls a fuel pumping quantity of the pump body 14a according to the computed fuel-supply-pressure.

If the fuel pump module 14 has a malfunction, the fuel-supply-pressure to the injector 12 is decreased even though the above fuel pressure control is executed. The injector 12 injects the fuel into the engine 10 insufficiently. The malfunction of the fuel pump module 14 includes a malfunction of the pump body 14a and a malfunction of the pressure regulator 14b. In the present embodiment, the computer determines whether a condition where the fuel-supply-pressure is less than or equal to a threshold pressure has been continued for an abnormality determination period Tab. Based on this determination result, the computer detects a malfunction of the fuel pump module 14. When a malfunction of the fuel pump module 14 is detected, a specified processing for abnormality is executed. The specified processing for abnormality includes a deceleration processing in which the fuel injection quantity is restricted. A malfunction indicator lump is turned on and diagnosis data are stored in a backup memory such as an EEPROM.

Factors causing a decrease in fuel-supply-pressure at the injector 12 include an irreversible factors such as malfunction of the pump body 14a and the pressure regulator 14b, and temporary factors. A temporary electrically poor connection between the pump body 14a and the ECU 30, or a temporary electrically poor connection between the pump body 14a and the power source are temporary factors causing a decrease in fuel-supply-pressure. Such a temporary factors does not require repair of the fuel pump module 14.

If the computer determines that temporary factors causing a decrease in fuel-supply-pressure are due to a malfunction of the fuel pump module 14, the deceleration processing is conducted in the abnormality processing. Under a condition where a restriction of the fuel injection quantity is not necessary, the deceleration processing causes a deterioration in drivability. Furthermore, the malfunction indicator lump is turned on to indicate the fuel pump module 14 has a malfunction. As the result, a driver is induced to repair the fuel pump module 14 even though a repair of the fuel pump module 14 is not necessary.

In the present embodiment, the computer does not detect a decrease in fuel-supply-pressure due to temporary factors as a malfunction of the fuel pump module 14.

Referring to FIGS. 2A to 3B, an abnormality detecting processing of the fuel pump module 14 will be described in detail hereinafter.

FIGS. 2A and 2B are timing charts showing an embodiment of the abnormality detecting processing. FIG. 2A shows an input signal to the injector 12, and FIG. 2B shows a fuel-supply-pressure. In FIGS. 2A and 2B, it is supposed that temporal poor connection between the pump body 14a and the ECU 30 occurs. Further, in FIGS. 2A and 2B, it is supposed that when the fuel-supply-pressure is less than a specified pressure, the fuel injection is stopped until the fuel-supply-pressure is returned to the target pressure.

When the input signal to the injector 12 rises at a time of t11, a fuel injection by the injector 12 is initiated. As the result, after the time of t11, the fuel-supply -pressure to the injector 12 is decreased from the target pressure. When the input signal to the injector 12 falls at a time of t12, the fuel injection is stopped. As the result, after the time of t12, the fuel pump module 14 pumps the fuel, so that the fuel-supply-pressure to the injector 12 increases. Then, at a time of t13, the fuel-supply-pressure is returned to the target pressure. After the time of t13, the variation in fuel-supply-pressure is repeated according to the rising and falling of the input signal to the injector 12.

When the poor connection between the pump body 14a and the ECU 30 occurs at a time of t14, the fuel pumping of the pump body 14a is stopped. Then, the fuel in the delivery pipe 16 is returned to the fuel tank 13 through the return passage having the orifice, so that the fuel-supply-pressure decreases afterward. When the poor connection between the pump body 14a and the ECU 30 is overcome at a time of t16, the fuel-supply-pressure starts increasing. Then, the fuel-supply-pressure is returned to the target pressure at a time of t18.

It should be noted that during a time period from the time of t14 to the time of t18, the fuel injection is stopped due to a decrease in the fuel pressure caused by a temporary poor connection between the pump body 14a and the ECU 30.

In a case that the threshold pressure for the abnormality detection processing is established at a pressure P1, which is a little smaller than the minimum pressure of the normal fuel pump module 14, the condition where the fuel-supply-pressure is less than the threshold pressure P1 continues for the abnormality determination period Tab in a period from the time of t15 to the time of t17. As the result, a temporary poor connection of the pump body 14a is detected as a malfunction of the fuel pump module. On the other hand, it is conceivable that the threshold pressure may be established at a pressure P2 which is lower that the pressure P1.

However, if the alcohol concentration of the fuel is varied, the decrease in fuel pressure due to a poor connection of the pump body 14a may be detected as a malfunction of the fuel pump module 14. That is, a stoichiometric air-fuel ratio of the fuel increases with the alcohol concentration of the fuel. The fuel injection quantity control increases the fuel injection quantity as the alcohol concentration becomes higher. The decrease in the fuel-supply-pressure due to the fuel injection becomes larger. Thus, according to the alcohol concentration, a condition where the fuel-supply-pressure is lower than the threshold pressure P2 continues for the abnormality determination period Tab or more. The decrease in fuel pressure due to a poor connection of the pump body 14a may be detected as a malfunction of the fuel pump module 14. In the present embodiment, the threshold pressure is established lower as the alcohol concentration of the fuel becomes higher.

FIGS. 3A and 3B are timing charts showing an embodiment of the abnormality detecting processing under a condition where the alcohol concentration is higher than the condition shown in FIGS. 2A and 2B. FIG. 3A shows an input signal to the injector 12, and FIG. 3B shows a fuel-supply-pressure.

In FIGS. 3A and 3B, it is supposed that higher alcohol concentration fuel is supplied to the engine than the situation shown in FIGS. 2A and 2B and the alcohol concentration is changed from "C1" to "C2". In FIGS. 3A and 3B, the graph of FIGS. 2A and 2B are illustrated by dashed lines for comparison. As shown in FIG. 3A, the input signal to the injector 12 is longer than that shown in FIG. 2A, so that the fuel injection period is longer than that shown in FIG. 2A. As the result, a decrease in fuel-supply-pressure due to the fuel injection becomes larger that that shown in FIG. 2B (refer to timing of t21 to t23).

In FIG. 3B, it is supposed that temporal poor connection of pump body 14a occurs at a time of t24. The fuel pressure drop (time of t24 to t28) started from a lower pressure than that shown in FIG. 2B. In FIG. 3B, the fuel pressure drop due to temporary poor connection of the pump body 14a is larger than that shown in FIG. 2B.

If the threshold pressure is established at P2, a condition where the fuel-supply-pressure is less than the threshold pressure P2 continues for the abnormality determination period Tab from a time of t25 to a time of t26, whereby the fuel pressure drop due to a temporary poor connection of the pump body 14a is detected as a malfunction of the fuel pump module 14.

According to the present embodiment, the threshold pressure is established at a pressure P3 which is lower than the pressure P2. Thus, it is restricted that the fuel-supply-pressure to the injector 12 becomes less than the threshold pressure. Further, it is restricted that the fuel pressure drop due to a temporary poor connection of the pump body 14a is detected as a malfunction of the fuel pump module 14. In FIG. 3, the fuel-supply-pressure does not become lower than the threshold pressure P3 due to a temporary poor connection of the pump body 14a during a period from a time of t24 to t26. Thus, a temporary poor connection of the pump body 14a is not detected as a malfunction of the fuel pump module 14.

Figure 4:
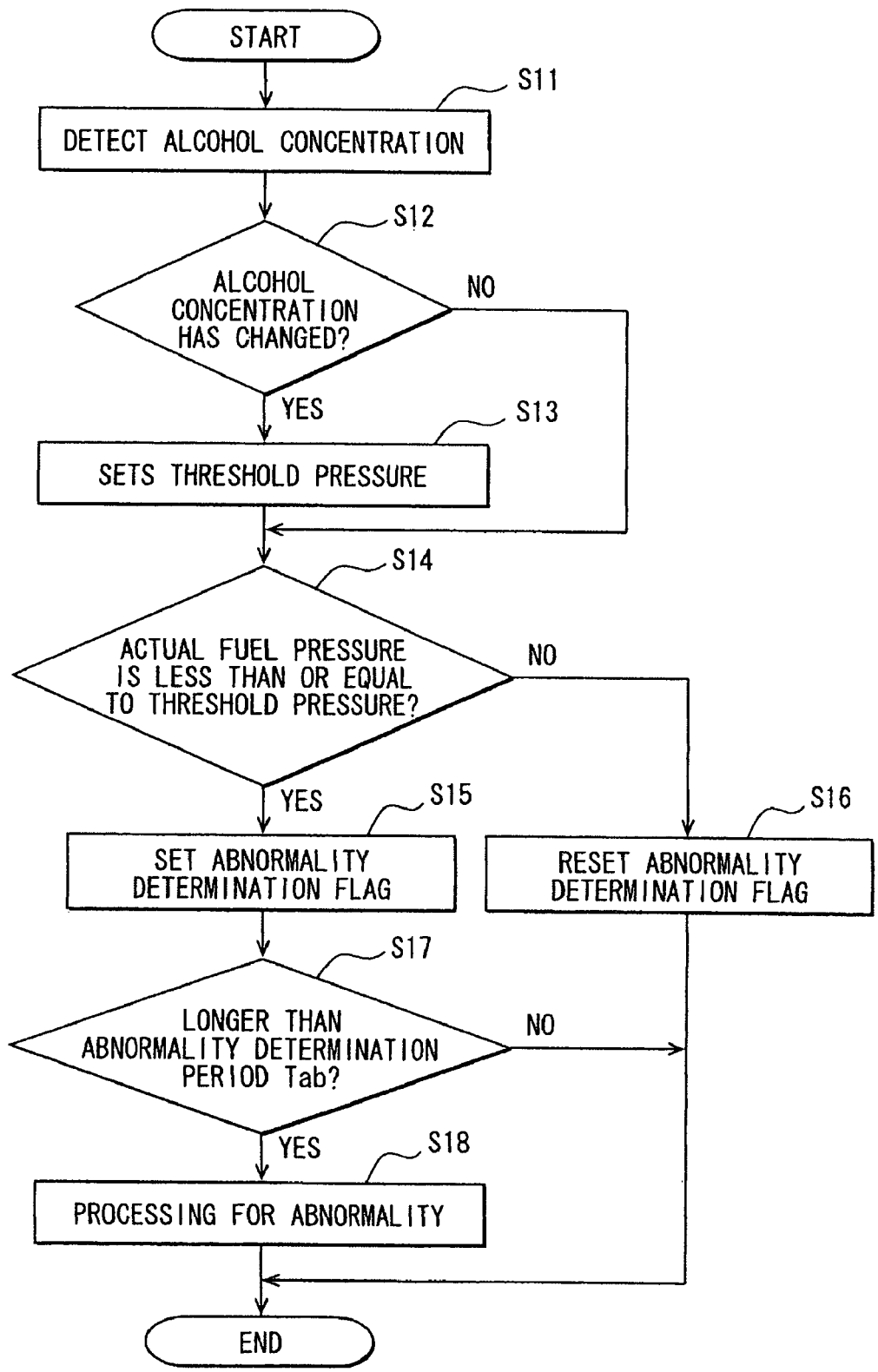
FIG. 4 is a flowchart showing an abnormality detection program of the fuel pump module.

Referring to FIG. 4, the abnormality detection processing of the fuel pump module 14 will be described. FIG. 4 is a flowchart showing an abnormality detection program to conduct an abnormality determination processing of the fuel pump module 14.

In S11, an alcohol concentration of the fuel is detected based on a detection signal of the fuel property sensor 17.

In S12, the ECU 30 determines whether alcohol concentration has changed. Specifically, the ECU 30 computes a difference between previously detected alcohol concentration and currently detected alcohol concentration. When this difference in concentration is greater than a specified value, the ECU 30 determines that alcohol concentration has changed.

When the answer is Yes in S12, the procedure proceeds to S13 In S13, the ECU 30 sets the threshold pressure lower as the alcohol concentration of the fuel is higher. Then, the procedure proceeds to S14. When the answer is No in S12, the procedure proceeds to S14 without performing S13.

In S14, the ECU 30 determines whether an actual fuel pressure is less than or equal to the threshold pressure. When the answer is Yes in S14, the procedure proceeds to S15 in which an abnormality determination flag is set. Then, the procedure proceeds to S17. The abnormality determination flag represents whether the actual fuel pressure is less than or equal to the threshold pressure. When the answer is No in S14, the procedure proceeds to S16 in which the abnormality determination flag is reset to end the program.

In S17, the ECU 30 determines whether a time period in which the abnormality determination flag is set is longer than the abnormality determination period Tab. When the answer is Yes in S17, the procedure proceeds to S18 in which a processing for abnormality is executed to end the program. When the answer is No in S17, the program ends without performing procedure of S18.

According to the present embodiment, following advantages can be obtained.

Since the threshold pressure for abnormality detecting processing of the fuel pump module 14 is set according to the alcohol concentration, it is restricted that a fuel pressure drop due to a temporary factor such as a poor connection of the pump body 14a is detected as a malfunction of the fuel pump module 14. Thus, it is restricted that the deceleration processing is executed under a condition where no fuel injection quantity limit is necessary. Further, it is restricted that a driver is induced to repair the fuel pump module 14 even though a repair of the fuel pump module 14 is not necessary.

According to the present embodiment, when a condition where fuel-supply-pressure is less than or equal to the threshold pressure continues for the abnormality determination period Tab, the computer detects a malfunction of the fuel pump module 14. If the computer determines that the fuel pump module 14 has a malfunction immediately when the fuel-supply-pressure drops to the threshold pressure, an erroneous determination may be established. That is, the ECU 30 may determine that the fuel pump module 14 has a malfunction even though the fuel pump module 14 has no malfunction. According to the present embodiment, such an erroneous detection can be avoided.

Other Embodiment

In addition to the threshold pressure for abnormality detecting processing of the fuel pump module 14, it is preferable that the abnormality determination period Tab is set according to the alcohol concentration. That is, the abnormality determination period Tab is set longer as the alcohol concentration of the fuel becomes higher. Thus, it is restricted that a condition where the fuel-supply-pressure is less than or equal to the threshold pressure continues for the determination period. A malfunction of the fuel pump module 14 is correctly detected.

Instead of the threshold pressure, the abnormality determination period Tab may be set according to the alcohol concentration of the fuel. That is, the threshold pressure is a fixed value and the abnormality determination period Tab is a variable value. The same advantage as the above embodiment can be obtained.

The present invention can be applied to an engine system in which a target pressure of the fuel-supply-pressure to the injector 12 is set according to a driving condition of the engine (engine speed or engine load). In this case, it is preferable that the threshold pressure and the abnormality determination period Tab may be set based on the engine driving condition and the target pressure. When the fuel pump module 14 has a malfunction, the fuel-supply-pressure to the injector 12 deviates from the target pressure. The threshold pressure and the abnormality determination period Tab are set based on the engine driving condition and the target pressure, whereby the threshold pressure and the abnormality determination period Tab can be set according to a deviation of the fuel-supply-pressure from the target pressure. Thus, a malfunction of the fuel pump module 14 is correctly detected.

The present invention can be applied to an engine system where an electric variable pressure regulator is disposed instead of the mechanical pressure regulator 14b. The variable pressure regulator can adjust a leak quantity of the fuel to the fuel tank 12 by a control of the ECU 30. An electrical poor connection between the pump body 14a and the variable pressure regulator or an electrical poor connection between the variable pressure regulator and the power source causes a fuel-supply-pressure drop. By adopting the present invention to the engine system having an electric variable pressure regulator, it is restricted that a temporary poor connection of the pressure regulator is detected as a malfunction of the fuel pump module 14.

The present invention can be applied to an engine system in which fuel injection quantity is varied according to alcohol concentration of the fuel. In this engine system, as the alcohol concentration becomes higher, the fuel injection quantity becomes larger. An open control of the fuel injection quantity is performed.

In the above embodiment, a processing (S11-S13) for setting the threshold pressure is conducted right before a processing (S14) in which it is determined whether the fuel-supply-pressure is less than or equal to the threshold pressure. However, the threshold pressure and the abnormality determination period Tab can be set at a timing in which the alcohol concentration must be changed. Specifically, an opening/closing of the filler neck 13a is detected based on a detection signal of the filler cap sensor 20. The threshold pressure and the abnormality determination period Tab can be set after a predetermined time has passed from the detection of the opening/closing of the filler neck 13a.

The present invention can be applied to a direct injection engine. Since the fuel injection pressure of the direction injection engine is larger than a port injection engine, the fuel-supply-pressure drop is larger than that of the port injection engine. Thus, the present invention is more effective in a direct injection engine.

What is claimed is:

1. A controller for an internal combustion engine applied to a fuel supply system in which at least one of a petroleum fuel and an alcohol fuel stored in a fuel tank is supplied to an internal combustion engine, the fuel supply system including a pump device pumping the fuel stored in the fuel tank and an injector injecting the fuel pumped by the pump device into the internal combustion engine, the injector injecting the fuel of which quantity is varied according to an alcohol concentration of the fuel, the controller detecting a fuel pressure supplied to the injector and detecting a malfunction of the pump device when the fuel pressure is less than or equal to a threshold pressure, the controller comprising:
   an alcohol concentration detecting means for detecting an alcohol concentration of the fuel supplied to the internal combustion engine; and
   a threshold pressure setting means for setting the threshold pressure lower as the alcohol concentration detected by the alcohol concentration detecting means is higher.

2. A controller controlling the fuel pressure supplied to the injector to a target pressure according to claim 1, further comprising:
   a target pressure setting means for setting the target pressure according to a driving condition of the internal combustion engine, wherein
   the threshold pressure setting means sets the threshold pressure based on at least one of the driving condition of the internal combustion engine and the target pressure set by the target pressure setting means.

3. A controller determining whether a condition in which the fuel pressure supplied to the injector is less than or equal to the threshold pressure continues for a abnormality determination period or more, and detecting a malfunction of the pump device based on a determination result according to claim 1, further comprising:
   a determination period setting means for setting the abnormality determination period longer as the alcohol concentration detected by the alcohol concentration detecting means is higher.

4. A controller controlling the fuel pressure supplied to the injector to a target pressure according to claim 3, further comprising:
   a target pressure setting means for setting the target pressure of the fuel supplied to the injector according to a driving condition of the internal combustion engine, wherein
   the determination period setting means sets the abnormality determination period based on at least one of the driving condition of the internal combustion engine and the target pressure set by the target pressure setting means.

5. A controller for an internal combustion engine applied to a fuel supply system in which at least one of a petroleum fuel and an alcohol fuel stored in a fuel tank is supplied to an internal combustion engine, the fuel supply system including a pump device pumping the fuel stored in the fuel tank and an injector injecting the fuel pumped by the pump device into the internal combustion engine, a controller controlling a fuel injection quantity, determining whether a condition in which the fuel pressure supplied to the injector is less than or equal to the threshold pressure continues for a abnormality determination period or more, and detecting a malfunction of the pump device based on a determination result, the controller comprising:
   an alcohol concentration detecting means for detecting an alcohol concentration of the fuel supplied to the internal combustion engine; and
   a determination period setting means for setting the abnormality determination period longer as the alcohol concentration detected by the alcohol concentration detecting means is higher.

* * * * *